Patented Feb. 7, 1928.

1,658,725

UNITED STATES PATENT OFFICE.

ALFRED LANDUCCI, OF PARIS, FRANCE, ASSIGNOR, BY MESNE ASSIGNMENTS, TO DU PONT-PATHE FILM MANUFACTURING CORPORATION, OF WILMINGTON, DELAWARE, A CORPORATION OF DELAWARE.

PROCESS FOR THE MANUFACTURE OF ARTICLES OF PLASTIC MATERIAL.

No Drawing. Application filed February 8, 1926, Serial No. 86,928, and in France February 20, 1925.

The present invention has for its object an improved process for the manufacture of threads, filaments, bands or films of a polished and transparent nature, from solutions of cellulose derivatives (esters or ethers).

It is a known fact that the said cellulose derivatives are dissolved in suitable organic solvents and are then converted into transparent or translucent plastic masses of various forms by the extraction of the said solvents either by evaporation or by precipitation or by coagulation by oils. It is also a known fact that the cellulose derivatives, esters or ethers in solution in organic solvents are precipitated by water, but in this case opaque plastic masses will be obtained.

This invention has for its object a process for the manufacture of threads, filaments, bands or films of a polished and transparent nature from cellulose derivatives (esters or ethers) which are dissolved in suitable organic solvents and are then coagulated by an aqueous bath when issuing from the apparatus whereby the solution is given a suitable form according to the desired manufacture (nozzles, dies and the like); the plastic substance thus obtained in the shape of threads, filaments, bands or films, is subsequently polished and rendered transparent without changing their form, by the effect of suitable solvents which are caused to act either in the liquid state—by immersion or by surface contact—or in the state of vapour.

This improved process affords the following advantages: the manufacture is carried out in a very rapid manner and at a small expense, and the solvents can be readily and completely recovered; further remarkable qualities of transparency, brilliancy, flexibility and strength can thereby be very easily obtained.

The organic solvents employed to dissolve the cellulose derivatives may vary within wide limits, it being simply necessary that they should be soluble in or miscible with the coagulating aqueous bath. For this latter bath may be employed water or any kind of aqueous solutions, for example aqueous solutions of alcohols or of solvents for the cellulose derivatives, solutions of salts such as sodium or calcium chloride, sodium nitrate or the like, or alcohols in which water is only partially soluble, such as amyl alcohol, butyl alcohol or others.

When the substance has been precipitated, the aqueous coagulating bath will contain almost the whole of the organic solvents which served to dissolve the cellulose derivatives, and these may be recovered by any known means.

The solvents which are necessary to impart the transparency and brilliancy to the plastic masses thus obtained in their definite form, and which act, in the state of liquids or vapours, by absorption, may be the same as those employed for dissolving the cellulose derivatives before the precipitation, or they may be different. In all cases, the quantity of the solvents utilized for imparting transparency to the threads, filaments, bands or films which are obtained, will be extremely small.

The presence of softeners or of charging substances in the solutions of cellulose derivatives will require no change in this improved process, and the same is true for the methods and apparatus used for the discharge of the solutions of cellulose derivatives into the coagulating aqueous baths.

By way of example, this invention may be carried out in the following manner:

*Example I.*—An acetone solution of nitro-cellulose or of acetate of cellulose is discharged from an orifice of small diameter and comes immediately into contact with very cold water, for instance between 4° and 10° C. The precipitation is complete within 1 or 2 minutes, according to the diameter of the stream. The resulting opaque filament may then be dried in air or preferably washed in alcohol in order to remove the water which has been absorbed. In order to make it transparent, it is placed in an atmosphere saturated with acetone vapour. The opacity will disappear, and a moderate drying will then suffice to remove all traces of the solvent thus absorbed. In this manner is obtained a filament whose brilliancy, flexibility and strength are quite remarkable.

*Example II.*—A solution of nitro-cellulose in an alcohol-acetone or alcohol-ether solvent is discharged in a continuous flat band upon a well-polished wheel which is partially immersed in a water tank. When in contact with the water (which is suitably renewed) the nitro-cellulose solution will be precipitated. The resulting film is then detached from its support and is passed through a drying chamber in which the water in the film is evaporated. To render the said film transparent, each of its faces may be successively acted upon by a solvent, for instance by drawing it upon guide rollers through suitable tanks containing the solvent. The film is then circulated through a drying chamber in which the solvent is evaporated.

*Example III.*—In a modification of the preceding example, the flat band of nitrocellulose collodion is discharged directly into a water tank, wherein the said band becomes solidified; the resulting film is then seized and drawn forward by rollers disposed at the bottom of the said tank. The remainder of the operations may be as specified in example No. 2.

Having now described my invention, what I claim as new and desire to secure by Letters Patent is:

1. Process for manufacturing articles of plastic material which consists in dissolving a cellulose derivative in an organic solvent, giving to the said solution the desired shape, coagulating the said solution in an aqueous bath whereby a more or less opaque product is obtained, subjecting the product to the action of a solvent adapted to make said coagulated substance transparent and polished and subsequently eliminating this latter solvent from the resulting plastic substance.

2. Process for manufacturing articles of plastic material which consists in dissolving a cellulose derivative in an organic solvent, giving to the said solution the desired shape, coagulating the said solution in an aqueous bath whereby a more or less opaque product is obtained, subjecting the product to the action of a solvent in the state of vapour adapted to make said coagulated substance transparent and polished and subsequently eliminating this latter solvent from the resulting plastic substance.

3. Process for manufacturing articles of plastic material which consists in dissolving a cellulose derivative in an organic solvent, giving to the said solution the desired shape, coagulating the said solution in an aqueous bath whereby a more or less opaque product is obtained, eliminating the water thus absorbed from the coagulated substance, subjecting the product to the action of a solvent adapted to make said coagulated substance transparent and polished and subsequently eliminating this latter solvent from the resulting plastic substance.

4. Process for manufacturing articles of plastic material which consists in dissolving a cellulose derivative in an organic solvent, giving to the said solution the desired shape, coagulating the said solution in an aqueous bath with which said organic solvent is miscible whereby a more or less opaque product is obtained, subjecting the product to the action of a solvent adapted to make said coagulated substance transparent and polished and subsequently eliminating this latter solvent from the resulting plastic substance.

5. Process for manufacturing articles of plastic material which consists in dissolving a cellulose derivative in an organic solvent, giving to the said solution the desired shape, coagulating the said solution in water, whereby a more or less opaque product is obtained, subjecting the product to the action of a solvent adapted to make said coagulated substance transparent and polished and subsequently eliminating this latter solvent from the resulting plastic substance.

6. Process for manufacturing articles of plastic material which consists in dissolving a cellulose derivative in acetone, giving to the said solution the desired shape, coagulating the said solution in cold water, whereby a more or less opaque product is obtained, eliminating the water thus absorbed from the coagulated substance, bringing said coagulated substance into contact with vapour of acetone adapted to make said coagulated substance transparent and polished and subsequently drying the resulting plastic substance.

In testimony whereof I have signed my name to this specification.

ALFRED LANDUCCI.